United States Patent [19]

Merrill, Jr.

[11] Patent Number: 4,517,097
[45] Date of Patent: May 14, 1985

[54] PROCESS FOR DILUTING AQUEOUS POLYMER SOLUTIONS

[75] Inventor: LaVaun S. Merrill, Jr., Englewood, Colo.

[73] Assignee: Marathon Oil Company, Findlay, Ohio

[21] Appl. No.: 580,967

[22] Filed: Feb. 16, 1984

[51] Int. Cl.³ .................................................. C02F 5/08
[52] U.S. Cl. .................... 210/696; 422/901; 524/424
[58] Field of Search .......... 210/696, 698, 701; 252/180, 181; 422/256, 901; 524/424, 425; 526/62; 528/484

[56] References Cited

U.S. PATENT DOCUMENTS

| 2,182,286 | 12/1939 | Doennecke et al. | 210/696 |
| 2,766,203 | 10/1956 | Brown et al. | 210/712 |
| 3,218,241 | 11/1965 | Checkovich | 210/696 |
| 4,320,215 | 3/1982 | Yonezawa et al. | 526/62 |
| 4,402,916 | 9/1983 | Luetzelschwab | 422/256 |

FOREIGN PATENT DOCUMENTS

| 0106293 | 4/1984 | European Pat. Off. | 526/62 |
| 52-32088 | 3/1977 | Japan | 526/62 |

Primary Examiner—Peter Hruskoci
Attorney, Agent, or Firm—Jack L. Hummel; Rodney F. Brown

[57] ABSTRACT

A process for preventing, or at least substantially reducing, scaling in an aqueous polymer dilution apparatus by injecting carbon dioxide gas into the solution to maintain the pH of the solution in a range which tends to hold scale forming substances in solution.

7 Claims, 1 Drawing Figure

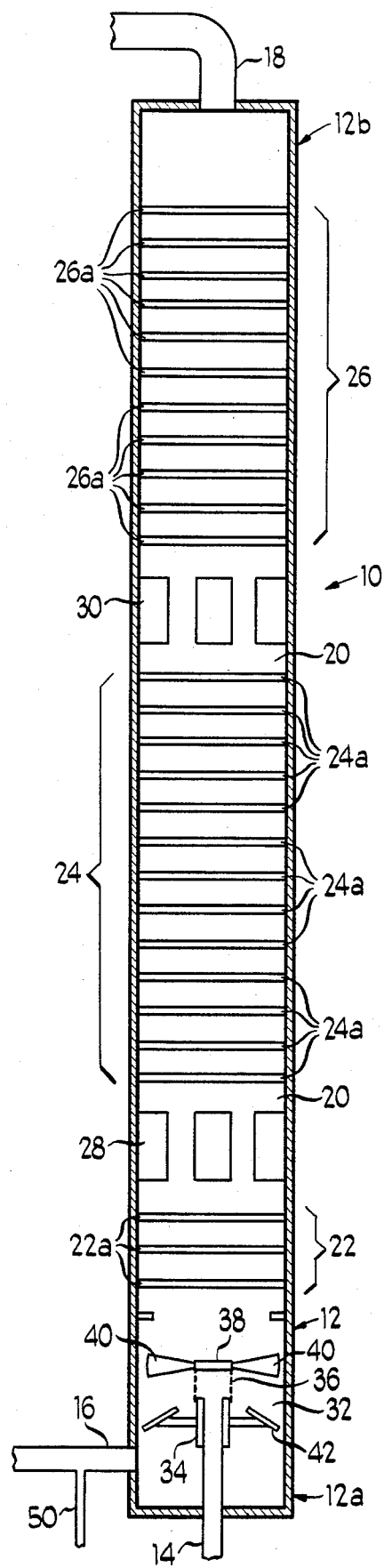

PROCESS FOR DILUTING AQUEOUS POLYMER SOLUTIONS

TECHNICAL FIELD

The present invention relates to a process for preventing, or at least substantially reducing, the formation of scale, and the like, water insoluble deposits on equipment during the dilution of aqueous solutions of polymers such as partially hydrolyzed polyacrylamides.

BACKGROUND OF THE PRIOR ART

The process of the present invention involves the preparation of aqueous polymer solutions having special utility as drive fluids and/or mobility buffers in the secondary or tertiary recovery of oil from subterranean oil-bearing formations or reservoirs. Such solutions are generally prepared from a water soluble, ethylenically unsaturated monomer containing at least one vinyl grouping wherein the vinyl is an acrylyl, a vinyl cyanide, a styryl, and water soluble salts thereof. When the vinyl is an acrylyl it may be represented by the formula:

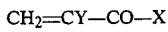

$$CH_2=CY-CO-X$$

wherein X is hydrogen, an amino group ($NH_2$), a hydroxy group, a methyl group or an OR group wherein R is a lower alkyl group, and wherein Y is hydrogen or a methyl group. Examples of suitable monomers include acrylamide, acrylic acid, acrylonitrile, methacrylic acid, methacrylamide, methacrylonitrile, methyl methacrylate, and sodium styrenesulfonate. Of this group of monomers, acrylamide is preferred. Polymerization of the monomer desirably is carried out in an aqueous solution containing about 1 to about 20 weight percent, preferably about 2 to about 12 weight percent, and most advantageously about 6 to about 8 weight percent monomer. The pH of the solution generally will be about 4 to about 11, usually about 6 to about 9. The temperature of the polymerization reaction can range from about 5° C. to about 100° C., with a temperature of about 20° C. to about 65° C. being preferred. The time required to complete polymerization of the monomer can vary from about 2 to about 20 hours. With lower concentrations of catalyst, polymerization times can be effectively reduced.

Since oxygen inhibits the polymerization reaction, it is desirable to limit the amount of free oxygen present to less than about 0.1 parts per million. Polymerization of the monomer is carried out in the presence of a free radical generating initiator. Exemplary of initiators suitable for this purpose are azo compounds such as azobisisobutyranitrile and azobisisobutyramidine chloride; peroxides such as hydrogen peroxide, sodium peroxide and benzoyl peroxide; alkyl and dialkyl peroxides such as, for example, t-butyl hydrogen peroxides and diethyl peroxide; alkali metal and ammonium persulfates including sodium persulfate, potassium persulfate and ammonium persulfate; and alkali metal bisulfites exemplified by sodium bisulfite and potassium bisulfite. Compatible mixtures of the foregoing may be used. In those instances where the monomer to be polymerized is an acrylamide, ammonium persulfate is the preferred free radical generating initiator.

The concentration of the free radical generating initiator used in the polymerization of the monomer usually will be about 50 ppm to about 500 ppm, preferably about 150 ppm to about 300 ppm, based upon the weight of the monomer in the polymerization reaction mixture.

A preferred polymer solution for use in the secondary and tertiary recovery of oil from an oil-bearing formation is an aqueous solution of a partially hydrolyzed polyacrylamide. Accordingly, following polymerization of the polymer, a hydrolyzing agent is added to the aqueous polymer solution. An especially effective agent for this purpose is a 50% solution of sodium hydroxide. The amount of hydrolyzing agent introduced into the polymer solution desirably is sufficient to hydrolyze approximately 20% to 40% of the amide groups comprising the polyacrylamide. One of the by-products of the hydrolysis reaction is ammonia which is generated in a molar amount in substantially direct proportion to the amount of hydrolyzing agent employed. More specifically in this connection, if 30 moles of base are used to hydrolyze the polymer, approximately 30 moles of ammonia will be produced during the hydrolysis reaction. As a result the pH of the aqueous solution of the partially hydrolyzed polyacrylamide is increased, usually to a level of about 10 to 12, or higher.

Generally speaking, the concentration of the partially hydrolyzed polymer in the aqueous solution will be about 6% to about 7%, and the solution will have a viscosity of about 450,000 cp to about 550,000 cp. It is necessary, prior to final dilution and injection, for example, into an input well of a subterranean oil-bearing formation or reservoir, to dilute the aqueous solution of the hydrolyzed polymer to provide a concentration of the polymer in the solution of about 1% to about 2%. Dilution of the hydrolyzed polymer solution advantageously is achieved by passing the solution through a series of dispersing stations which act to progressively increase the surface area of the polymer. By thusly continuously exposing previously unexposed surface areas of the polymer to water, the take-up or absorption of water by the polymer is appreciably enhanced, and dilution can be effectively carried out in a matter of minutes. Apparatus especially suitable for this purpose is disclosed in U.S. Pat. No. 4,402,916. However, it has been found that when the apparatus is used with water of the type available at most oil fields, scaling occurs on the perforated members comprising the dispersing stations of the apparatus. Scaling, in the main, is due to the deposition of calcium carbonate present in the water employed as the diluent for the aqueous polymer solution. The build-up of such deposits on the perforated members reduces their ability to increase the surface area of the polymer thereby lessening the efficiency of the apparatus and eventually plugging the unit.

BRIEF SUMMARY OF THE INVENTION

The process of the present invention provides an effective, efficient and inexpensive means for eliminating, or at least substantially reducing, scaling in apparatus of the type disclosed in U.S. Pat. No. 4,402,916. The process can be carried out, moreover, without any alteration in the arrangement of the elements comprising such apparatus, and without, furthermore, in any way adversely affecting the performance capabilities of the diluted aqueous polymer solution. The process, in its preferred aspects, involves the use of a gaseous substance which is soluble, or at least partly soluble, in water, and which is characterized in that it is capable of altering the pH of the aqueous polymer solution in a manner to inhibit scale formation in the dilution apparatus. The gaseous substance is further characterized in that it is substantially inert with respect to the polymer comprising the aqueous polymer solution.

BRIEF DESCRIPTION OF THE DRAWING

FIG. 1 is a schematic representation, shown in elevation, of an embodiment of an apparatus useful in carrying out the process of the present invention.

DETAILED DESCRIPTION OF THE INVENTION

To the extent that the apparatus and method disclosed in U.S. Pat. No. 4,402,916 have applicability to the practice of the present invention, the subject matter of that patent is incorporated herein by reference.

As stated hereinabove, the hydrolyzation of a polymer such as polyacrylamide generates ammonia ($NH_3$) in an amount directly proportional to the number of moles of base employed to hydrolyze the polymer. The ammonia remains in solution, and acts to raise the pH of the solution to a level which favors the formation of scale due to the presence of compounds such as calcium carbonate ($CaCO_3$) in the aqueous medium. In accordance with the present invention, it has been discovered that scaling in the dilution apparatus can be eliminated, or substantially reduced, by carrying out the dilution of the partially hydrolyzed polymer solution in the presence of a gas, in particular, carbon dioxide, in an amount sufficient to lower the pH of the solution to a level which tends to cause scale forming substances such as calcium carbonate to remain in solution throughout the dilution process. Carbon dioxide, apart from its ability to lower the pH of the aqueous polymer solution, is inert with respect to the polymer comprising the solution. The relatively low cost of carbon dioxide, and its ease in handling, make it particularly suitable for use in an on-site, in-line aqueous polymer solution preparation operation.

The carbon dioxide gas advantageously is injected into the water stream prior to the water contacting the partially hydrolyzed polymer solution. However, the gas may be introduced into the inlet end of the dilution apparatus provided it is well dispersed before it reaches the polymer dispersing stations of the dilution apparatus.

In accordance with a preferred practice of the invention, the amount of gas injected should be sufficient to saturate, or nearly saturate, the polymer solution, and, most preferably, should be injected in an amount of about 1.5 to about 2 times that required to attain saturation. Depending upon the salt content, especially the calcium carbonate content of the water being used, greater amounts of gas may be required. This can readily be determined by sampling the polymer solution as it moves through the dilution apparatus. A solution which has been saturated, or nearly so, with the gas, or which contains an amount of the gas in excess of that required for saturation, will have a pH of the order of about 6.5 to about 8.5. It has been found that the highest degree of scale reduction is achieved at a solution pH of about 6 to about 7, the upper effective limit being a solution pH of about 8.3 to about 8.5.

The carbon dioxide gas is believed to combine with the ammonia ($NH_3$) present in the aqueous partially hydrolyzed polymer solution, and to increase the bicarbonate level in the aqueous solution thereby acting to reduce the pH of the solution and to maintain scale forming agents such as calcium carbonate ($CaCO_3$) in a soluble state. This condition persists throughout the dilution process, and thus prevents, or substantially reduces, the deposition of scale on the components, particularly the perforated dispersing stations, of the dilution apparatus.

Referring, now, to the drawing, the embodiment of the dilution apparatus illustrated, and designated generally by reference numeral 10, comprises an elongated cylinder or tube 12 provided with openings at inlet end 12a thereof for an aqueous polymer solution conduit 14 and a fluid diluent conduit 16. The outlet end 12b of the tube 12 has an opening for receiving an end of a discharge conduit 18.

The tube 12 defines a chamber 20 in which a plurality of polymer solution dispersing stations 22, 24 and 26 are arranged. The chamber 20 also has positioned therein flow control elements 28 and 30 which may comprise static mixers of the type sold under the designations Sulzer SMX, SMV and SMXL, manufactured by Koch Engineering Company Inc. The flow control elements function to maintain and enhance the laminar flow of the polymer solution as its passes from one dispersing station to the next. The dispersing stations 22, 24 and 26 each comprise a plurality of perforated plates and/or screens 22a, 24a and 26a, respectively, the perforations in the plates and the mesh size of the screens at each of the stations being different. The size of the openings in the plates and the mesh size of the screens are largest at the inlet end of the chamber 20, and smallest at the outlet end thereof.

The inlet 12a of the tube 12 desirably has a polymer solution distributor 32 which, as shown, includes a coupling 34 which carries a perforated sleeve 36. A cap 38, having a plurality of shaped, polymer solution dispersing blades or paddles 40, is secured on the sleeve 36. A cone shaped ring 42 is attached to the coupling 34 to increase the velocity of the fluid diluent along the perforated sleeve 36. The function and operation of the distributor 32 are essentially the same as the corresponding unit shown in FIG. 3 of U.S. Pat. No. 4,402,916.

As shown, a gas injection conduit 50 intersects the fluid diluent conduit 16. The conduit 50 is in communication with a source (not shown) of gas such as carbon dioxide. Gauges and valves (not shown) advantageously are associated with the gas source to regulate the flow of gas into the water stream to provide a saturated, or near saturated, solution of the gas in the chamber 20. While the gas injection conduit 50, as illustrated, is connected to the diluent conduit 16, the injection conduit 50 may be connected directly to the chamber 20 preferably at a point adjacent to the distributor 32 to assure uniform and adequate distribution of the gas in the polymer solution entering the chamber 20 through the conduit 14.

In utilizing apparatus such as that shown in FIG. 1 to dilute an aqueous polymer solution in accordance with the process of the present invention, the solution is introduced into the chamber 20 by initially passing it through the distributor 32 to disperse the polymer and increase its surface area. At the same time, the solution is brought into contact with water, saturated with carbon dioxide gas, passing into the chamber 20 through the conduit 16. As the polymer solution continuously and successively passes through each of the dispersing stations 22, 24 and 26, the surface area of the polymer is increased to expose previously unexposed surface areas of the polymer to the diluent. The laminar flow of the polymer solution in the chamber is regulated and maintained by the flow control elements 28 and 30 thereby preventing any turbulence from developing in the chamber which otherwise might result in degradation or thinning of the polymer during dilution. The pH of the solution is continuously monitored throughout the dilution procedure.

The volume of polymer solution and water introduced into the chamber is controlled so that when the polymer solution reaches the outlet end of the chamber, the polymer will have taken-up or absorbed an amount of water sufficient to reduce the concentration of the polymer in the solution to a predetermined level. In diluting an aqueous solution of a partially hydrolyzed polyacrylamide, for example, the volume of water employed can be in the range of 15 to about 150 times that of the aqueous polymer solution. Thus, to illustrate, in forming a 1% solution of a partially hydrolyzed polyacrylamide from a 6% to 7% starting solution of the polymer, the polymer solution will be introduced at a rate of approximately 1 to about 2 gallons per minutes, while at the same time water will be introduced at the rate of 6 to 7 gallons. The pressure drop across the system in such a case will be about 20 to about 30 psi. Sufficient carbon dioxide gas is injected to maintain the pH of the polymer solution at a level of the order of about 6.5 to about 8.5, preferably about 7 to about 7.5, throughout the chamber 20.

The diluted material discharged from the chamber is substantially uniform, and may be further diluted to provide a material of the desired concentration for immediate injection into an input well of an oil-bearing formation. Where the aqueous polymer solution comprises a partially hydrolyzed polyacrylamide, the concentration of the polymer in the final diluted solution usually will be about 50 to about 5000 ppm, especially desirably about 500 to about 2000 ppm. The carbon dioxide gas present in the solution does not in any way adversely affect the injectivity and mobility properties of the solution thereby enabling the solution to meet the performance demands of an oil-bearing formation or reservoir into which it is injected.

While the process of the present invention has been described with relation to specific types of aqueous polymer solutions and polymer dilution apparatus, it should be understood that such description is given by way of illustration and example, and not by way of limitation.

What is claimed is:

1. A process for preventing, or at least substantially reducing, scaling in apparatus used for diluting an aqueous solution of a partially hydrolyzed polyacrylamide which solution contains scale forming substances, comprising the step of introducing carbon dioxide gas into the solution in an amount sufficient to maintain the pH of the solution at a level which acts to keep scale forming substances in solution during dilution.

2. A process according to claim 1 wherein the carbon dioxide gas is injected into the diluent employed to dilute the aqueous solution of the partially hydrolyzed polyacrylamide.

3. A process according to claim 2 wherein the diluent is water.

4. A process according to claim 1 wherein the carbon dioxide gas is injected directly into the aqueous solution of the partially hydrolyzed polyacrylamide.

5. A process according to claim 1 wherein sufficient carbon dioxide gas is introduced to at least saturate the partially hydrolyzed polyacrylamide solution.

6. A process according to claim 1 wherein sufficient carbon dioxide gas is introduced to maintain the pH of the solution at a level of about 6.5 to about 8.5 during dilution of the solution.

7. A process according to claim 1 wherein the solution is maintained at a pH of about 6 to about 7 during dilution of the solution.

* * * * *